United States Patent [19]
Lebee

[11] Patent Number: 6,108,744
[45] Date of Patent: Aug. 22, 2000

[54] SOFTWARE INTERRUPT MECHANISM

[75] Inventor: Pierre Lebee, Crepy-en-Valois, France

[73] Assignee: Sun Microsystems, Inc., Palo Alto, Calif.

[21] Appl. No.: 09/062,784

[22] Filed: Apr. 16, 1998

[51] Int. Cl.[7] ........................................ G06F 9/48
[52] U.S. Cl. ............................ 710/266; 712/244
[58] Field of Search ................... 710/260, 261, 710/266; 712/244

[56] References Cited

U.S. PATENT DOCUMENTS

| | | | |
|---|---|---|---|
| 5,515,538 | 5/1996 | Kleiman | 710/260 |
| 5,694,604 | 12/1997 | Reiffin | 709/107 |
| 5,768,599 | 6/1998 | Yokomizo | 710/260 |
| 5,961,585 | 10/1999 | Hamlin | 709/108 |

OTHER PUBLICATIONS

"Chorus/ClassiX", Release 3, Technical Overview, Oct. 1997.

*Primary Examiner*—Glenn A. Auve
*Attorney, Agent, or Firm*—McDermott, Will & Emery

[57] ABSTRACT

An interrupt mechanism for an operating system is portable to different data processing hardware. The interrupt mechanism includes a software interrupt management component which manages at least one software interrupt process and buffers system parameters in an interrupt stack during the software interrupt processing. The management component is configured to be hardware independent. A hardware dependent component is operable to select the interrupt stack and then to call the management component for managing software interrupt processing. The hardware dependent interface also deselects the interrupt stack on completion of software interrupt processing. It is thus possible to provide generic management process for software interrupts with a minimum of "glue" code.

19 Claims, 5 Drawing Sheets

SOFTWARE INTERRUPT MECHANISM

BACKGROUND OF THE INVENTION

This invention relates to an interrupt mechanism for an operating system. It relates to an interrupt mechanism suitable, in particular, for use with a real-time operating system which is portable. It also relates to an operating system including such an interrupt mechanism, to a data processing system including such an interrupt mechanism and to a method of processing interrupts.

In a conventional interrupt mechanism which is typically used in non real-time systems such as the UNIX operating system, interrupt processing is provided at a hardware interrupt level. (UNIX is a registered trademark in the United States and other countries, licensed exclusively through X/Open Company Ltd.) In such an interrupt mechanism, interrupts are typically allocated one of a number of different interrupt levels, for example eight, where 0 is the highest level and 7 is the lowest level. When an interrupt of a given level (say level 4) is being processed, an interrupt of a higher level (say level 2) can pre-empt (interrupt) the processing of the level 4 interrupt, whereby the level 2 interrupt is completed before processing of the level 4 interrupt is completed. A disadvantage of this approach is, however, that when the interrupt of a given level (say level 4) is being processed, lower level interrupts are masked. The masking of lower level interrupts is disadvantageous, particularly in real-time systems, as it prevents real-time processing of the interrupts.

An alternative approach to the handling of interrupts, which finds application to real-time operating systems, employs the use of interrupt threads. An example of a real time operating system which uses interrupt threads to process interrupts is the CHORUS/ClassiX operating system. This operating system is largely written in high level computer language to be hardware independent and comprises the minimum of hardware dependent "glue" code. An interrupt thread having a very short critical section is used to process interrupts rather than performing this at the interrupt level itself. Specifically, an interrupt handler wakes up a high priority thread (an interrupt thread) using a binary semaphore. The interrupt thread which has been activated carries out the necessary tasks and then control can be returned to the interrupted thread. Although this approach is better than a hardware level approach in a real-time environment (as there is no masking of interrupts), it is still not entirely satisfactory due to the delays involved in rescheduling, i.e. in switching from the interrupted thread to the interrupt thread and then back again.

In a real time system, particularly but not exclusively in environments which require high interrupt handling performance, for example for telecommunications industry environments, there is a need to optimise interrupt handling as much as possible. A conventional approach for optimising critical software components in computing systems is to use low level (assembler) code to provide the necessary processing functionality. However, this approach is not available if it is intended to provide an operating system which can be ported to different hardware environments with the minimum of modification. In order to be portable, the operating system has substantially to be generic to all environments with as little as possible "glue" code to attach the generic operating system to a specific hardware base.

Accordingly, there is a need for an interrupt mechanism which can improve interrupt handling, particularly in the context of a real-time portable operating system.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims.

In accordance with one aspect of the invention, there is provided an interrupt mechanism for an operating system which is portable to different data processing hardware. The interrupt mechanism includes a software interrupt management component which manages at least one software interrupt process and buffers system parameters in an interrupt stack during software interrupt processing. The management component is configured to be hardware independent. A hardware dependent component is operable to select the interrupt stack and then to call the management component for performing the software interrupt process. The hardware dependent component also deselects the interrupt stack on completion of the software interrupt processing.

An embodiment of the present invention thus provides the significant technical advantage of being able to provide a generic software interrupt management for software interrupts with a minimum of "glue" code. The "glue" code provides functions of selecting and deselecting an interrupt stack for the temporary storage of system parameters during the interrupt processing and calling the generic software interrupt manager. This "glue" code can typically be achieved in a very small number of lines of instruction machine code (for example 5 to 10 lines of assembly code).

When the operating system is used in a hardware environment which provides a system stack (for example a conventional microprocessor) the selecting operation can be switching from the system stack to the interrupt stack and the deselecting operation can be switching from the interrupt stack to the system stack. In other hardware environments which do not provide a system stack, for example a transputer, the selection operation can involve creating an interrupt stack (for example by identifying an area of memory to act as the interrupt stack), and the deselection operation can simply comprise deselecting that area of memory.

Where reference is made to an interrupt stack, it should be noted that this does not require any particular data storage structure, but merely refers to a data storage structure or mechanism which permits the buffering and retrieval of system elements. Thus the interrupt stack could simply be implemented as a designated area of general purpose random access storage.

A software interrupt trigger component can be provided which is responsive to an interrupt event to call the hardware dependent component. The trigger component can be responsive to an interrupt from a hardware interrupt handler at the end of hardware interrupt processing and/or to an interrupt from a task.

Each software interrupt handler can be allocated a priority level and processing of the software interrupts can be in priority level order.

The present invention also provides, in a data processor, an operating system portable to different hardware, which operating system includes an interrupt mechanism as set out above. The operating system can be implemented as a computer program on a carrier medium.

The invention further provides a method of processing interrupts in a data processing system including an operating system portable to different data processing hardware. The method includes steps of:

in a hardware dependent component, selecting an interrupt stack and calling a hardware independent software interrupt management component;

in the hardware independent software interrupt management component, managing at least one software interrupt process and buffering system parameters in the interrupt stack during software interrupt processing; and in the hardware dependent component, deselecting the interrupt stack on completion of the software interrupt processing.

BRIEF DESCRIPTION OF THE DRAWINGS

Exemplary embodiments of the present invention will be described hereinafter, by way of example only, with reference to the accompanying drawings in which like reference signs relate to like elements and in which.

DESCRIPTION OF THE PREFERRED EMBODIMENTS

Figure 1:
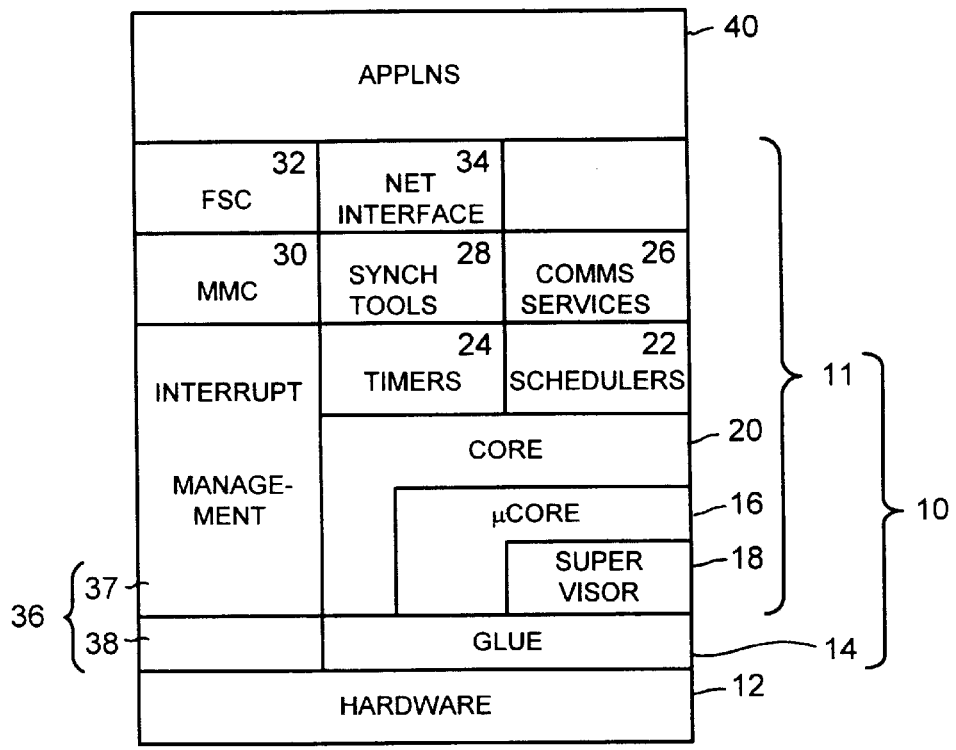
FIG. 1 is a schematic representation of a portable operating system environment.

FIG. 1 is a schematic overview of a portable operating system configuration incorporating an interrupt mechanism 10 according to an embodiment of the invention. As shown, the portable operating system resides on computing apparatus hardware 12 and supports software applications 40. A preferred embodiment of the portable operating system is implemented substantially in a high level language, such as for example C++, which can be ported onto widely differing hardware. To adapt the largely generic portion 11 of the operating system 10 which is implemented in a high level language, "glue" code 14 is provided for each hardware configuration onto which the operating system is to be ported. The "glue" code provided in any specific hardware environment, is particular for the hardware of that environment. The generic portion of the code is designed to minimise the "glue" code needed as far as practically possible. Accordingly, for each hardware environment, different "glue" code is provided.

The portable operating system illustrated in FIG. 1 is designed to support real-time applications. It is based around a microcore executive, or microkernel 16. This provides a supervisor 18 and support for single multi-threaded applications, basic synchronisation and user-provided management of interrupts, traps and exceptions. In order to support general purpose applications, the microkernel can be extended to form a core executive, or kernel 20. The kernel 20 provides, in addition to the functions of the microkernel 16 already mentioned, support for multiple independent applications (actors), support for trusted user and system applications, support for applications in user and supervisor address space and dynamic memory management.

The core modules 16/20 can be complemented by additional services (personalities) in order to meet application needs. A number of these are illustrated in FIG. 1. These can include one or more scheduler(s) 22, timer(s) 24, communication services 26, synchronisation tool(s) 28, memory management controller(s) 30, file system controller(s) 32 and network interface(s) 34.

In an embodiment of the invention, a software interrupt mechanism 36 is provided. As will be described in more detail below, this comprises a generic, portable portion 37 and a hardware specific portion 38. The generic portion 37 is shown separate from the microkernel 16 and kernel 20 of FIG. 1. The interrupt mechanism may be implemented a module separate from the microkernel 16 and kernel 20, or could alternatively be incorporated as an integral part thereof. Also, the functions of other modules illustrated in FIG. 1 could be implemented as integral to the kernel 20 or microkernel 16 or with the functions of other modules as desired. However, the integration of one or more of the modules in the kernel 20 or microkernel 16 could lead to a loss of flexibility of the operating system in that the resource requirements may exceed those of a desired target system.

Figure 2:
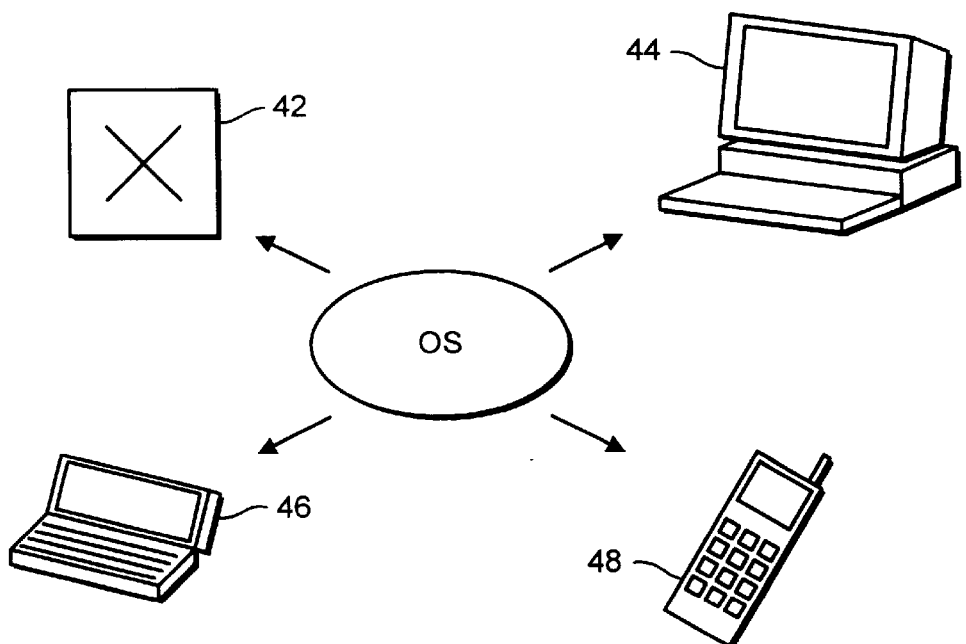
FIG. 2 is a schematic representation of the porting of such an operating system to different types of processing devices.

As represented in FIG. 2, a preferred example of an operating system according to FIG. 1 should enable the operating system to be ported to a wide variety of target systems, such large highly parallel systems as are found, for example, in telephone switches 42, smaller operating system environments such as single or multi-user workstation environments 44, personal organiser and web browser devices 46 and mobile telephones 48. A common aspect of the target systems is the provision of a processing engine and program storage, although this may take widely different forms. Thus, the processing engine may be a microprocessor, a microcontroller, or may have yet other forms. Also the memory may be integral to the processing engine hardware (e.g. where the processing engine is implemented on a ASIC), or may be separate therefrom (eg. RAM or ROM connected to the processing engine via a bus). Also, although in a typical environment an operating system and interrupt mechanism in accordance with the invention will be held as software in a memory or other data carrier (e.g. on a disc on tape), they could also be implemented, at least in part, by special purpose hardware (e.g. by being hard-wired in an ASIC).

Accordingly, it will be appreciated that considerable flexibility is required to enable an operating system to be ported to such widely differing hardware environments. The modular configuration illustrated in FIG. 1 allows the personality of the operating system to be configured to the particular target environment with the "glue" code enabling the adaptation of the generic code to the hardware of the target environment.

The CHORUS/ClassiX operating system mentioned in the introduction includes structure generally similar to that illustrated in FIG. 1 with the exception that it does not include a software interrupt mechanism (36,37,38) according to the invention. Instead, in the CHORUS/ClassiX operating system, software interrupts are handled by causing an interrupt handler to wake up a high priority thread (the interrupt thread) using a binary semaphore. An interrupt thread blocked on this semaphore is woken up and carries out the necessary processing. This mechanism is not fully satisfactory because it requires rescheduling operations. The time penalty for performing task switching between the interrupted task thread and the interrupt thread and back may not be insignificant in real time applications.

In contradistinction thereto, with a software interrupt mechanism 36, 37, 38 according to an embodiment of the invention, there is no need to wake up an interrupt thread. At an interrupt level, when an interrupt handler has been called and when the supervisor is about to return from interrupt, software interrupts are called according to relative priorities of those software interrupts.

In the following some of the general characteristics of an embodiment of an interrupt mechanism according to the invention will firstly be described.

The interrupt mechanism allows interrupt handlers (software interrupt handlers) to be invoked from an interrupt or other dedicated stack in a fully controlled way. In an embodiment of the invention a software interrupt is entirely managed by software and requires no specific hardware mechanism to trigger it. A software interrupt can be considered to have the lowest interrupt priority among all interrupts (i.e. an interrupt priority below all hardware interrupt levels). Thus, any hardware interrupt handler can pre-empt a software interrupt handler. In other words, a software interrupt handler is always called with all interrupts unmasked.

A software interrupt can be triggered at any time by a task or by an interrupt handler. In this latter case, the software interrupt handler is not immediately triggered, but will be invoked at the end of any hardware interrupt processing. Where a software interrupt handler is invoked from a task, however (i.e. not at a hardware interrupt level), it is immediately triggered.

A software interrupt handler can trigger another software interrupt handler. It can also invoke itself. In this case, a check is made for infinite recursive loops. The software interrupt mechanism is provided for trusted privilege routines. The software interrupt mechanism is configured such that when a software interrupt handler is executing, the scheduler is locked, so that no task can pre-empt this handler. The locking of the scheduler can be performed in a conventional manner.

It should be noted that where the interrupt mechanism is to be ported onto a real-time kernel, all software interrupt handlers are arranged to have a deterministic behaviour (i.e. processing time is strictly bounded), to avoid disturbing the real-time characteristics of the kernel.

Each software interrupt handler is assigned its own priority level. In a preferred embodiment a priority level between 0 and 7 is assigned with the highest priority being 0. The software interrupt handlers are executed according to their own priority level and not according to a temporal order of invocation (except in the instance described below where two software interrupt handlers of the same priority are to be executed). For instance, when an interrupt handler (triggered by a hardware interrupt) invokes a software interrupt handler at priority 3 and another one at priority 1, after processing the hardware interrupt, the software interrupt of priority 1 will be executed first and then the software interrupt of priority 3. Priorities guarantee an order of execution for different level of priorities. Where at least two software interrupt handlers have the same priority, the order of invocation for these two handlers follows a FIFT (First In First Triggered) policy.

When a software interrupt handler calls a higher priority software interrupt handler, the latter software interrupt handler will be invoked after the completion of the current one. There is no real pre-emption in this case.

A software interrupt handler can also be preempted by a higher priority software interrupt handler. This pre-emption is based on hardware interrupt pre-emption. Hardware interrupt handlers have their own priority. During hardware interrupt processing, if a higher priority interrupt is sent to the processor, it pre-empts the current one. A similar mechanism is used for the software interrupt handlers which are invoked by hardware interrupt handlers. For example, consider the following situation.

While a software interrupt handler of priority 4 is executing, a hardware interrupt occurs which calls a software interrupt handler of priority 3. The hardware interrupt pre-empts immediately the current software interrupt handler. When this hardware interrupt handler completes its processing, the software interrupt handler 3 will be triggered and then, after it completes, the software interrupt handler of priority 4 continues its processing.

One feature of a preferred embodiment of the invention is the portability of the mechanism. Up to 90% of the source code is written in the C language and it neither is dependent on a particular form of hardware mechanism, nor makes any assumption about the target machine. There is also no assumption about dedicated instruction to perform a special exception or a trap such as 'int' on Intel family, 'tr' or 'sc' on PowerPC family, or 'trap' on the Motorola processor families. A non-portable "glue" code portion provides the following operations:

switch from the current stack to an interrupt stack, call a routine and return to the current stack after completion of this routine; and invoke a generic routine at the end of the hardware processing interrupt according to the value of a global variable.

These two operations require in most cases less than 20 lines of assembly code.

A software interrupt can be triggered by a thread (i.e. in response to a task), or at interrupt level (i.e. at a hardware interrupt level). In the first case a dedicated interrupt vector is reserved and a trap is generated by a particular assembly instruction (for example, 'int' on x86-type processor, 'ti' on PowerPC-type processor, etc . . . ). In the second case the interrupt is recorded and is dispatched on return from the hardware interrupt as illustrated in Table 1 below, which provides an overview of the calling of a software interrupt from the supervisor 18.

TABLE 1

SOFT INTERRUPT--->
   1   Save registers
   2   Goto 4
INT i----->
   1   Save registers
   2   Switch on interrupt stack
   3   Call the interrupt handler----------------------->...
   4   If any software interrupt call them--------------->...
   5   Switch on system stack of the interrupted thread
   6   Call the scheduler
   7   Restore registers
<------- 9   Return from interrupt Software interrupts can also be pre-emptable. Interrupts are not masked when a software interrupt handler is called so that so it is possible that a (hardware) interrupt occurs and pre-empts the current processing. The hardware interrupt handler can also trigger a software interrupt. More complex schemes are also possible with multiple interrupts and multiple triggered software interrupts. On return from the penultimate nested level of interrupt, if a higher priority software interrupt has been triggered, only higher priority software interrupts are processed as is represented in Table 2 below.

TABLE 2

```
INT i ----->
         1   Save registers
         2   Switch on interrupt stack
         3   Call the interrupt handler-----------------------> ...
         4   If any software interrupt call them---------------> ...
INT j ------->
         1   Save registers
         2   Call the interrupt handler----------------------> ...
INT x---------->...
<-------------
         4   If we return from interrupt j and if one or multiple
             higher priority software interrupt has been triggered
             call it or them------------------------------> ...
         5   Restore registers
<-----------  6   Return from interrupt j
         5   Switch on system stack of the interrupt thread
         6   Call the scheduler
         7   Restore registers
<-------  9   Return from interrupt i
```

Tables 1 and 2 give an overview of the relationship of software interrupts to hardware interrupts and an overview of pre-emption, respectively. However, they do not address the question of portability of a software interrupt mechanism and of an operating system incorporating such a mechanism. This will be explained in more detail in the following with reference to an example of an embodiment of the invention.

Figure 3:
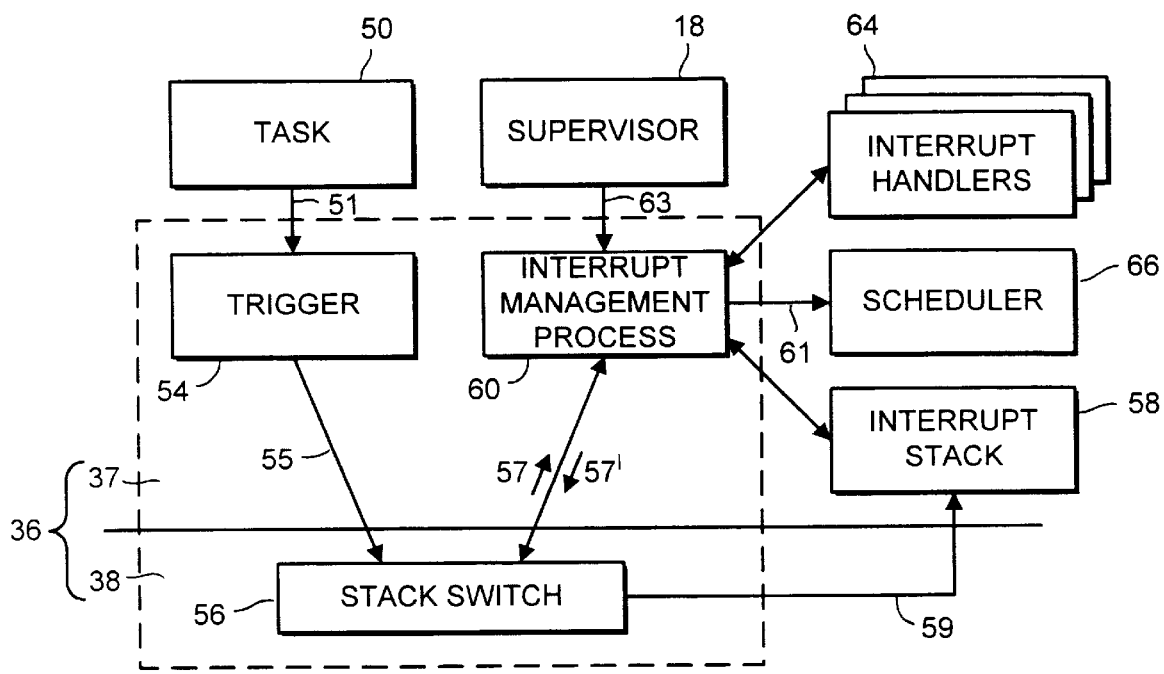
FIG. 3 is a schematic block diagram of a portable software interrupt mechanism.

FIG. 3 is a block representation of the relationship between elements of an embodiment of the invention. As shown in FIG. 3, a software interrupt mechanism 36 comprises a generic portable portion 37 and a hardware specific non-portable portion 38. The generic portion comprises a trigger component 54 and a software interrupt process management component (management component) 60. The trigger component is called (51) by a software interrupt from a task 50 (i.e. from a thread) when a software interrupt occurs. When software interrupt handling is to be triggered, the trigger component 54 calls (55) a stack switching component 56, which forms or forms part of the hardware specific portion 38. The stack switching component 56 switches in (59) an interrupt stack 58 for the interrupt handling and then calls (57) the management component 60 in the generic portion for carrying out interrupt handling using one or more interrupt handlers 64. On completion of the interrupt handling, the management component 60 calls (57') the stack switching component 56, which switches off the interrupt stack 58. Control then returns to the management component 60 which calls (61) a scheduler 66 if re-scheduling of tasks is required. It should be noted that rescheduling is not required as a matter of course, but merely if particular circumstances have lead to a rescheduling being needed. It should be noted that the management component 60 can be called directly by the hardware supervisor 18. This can occur on completion of hardware interrupt handling, possibly following hardware interrupt pre-emption of software interrupt handling.

Figure 4:
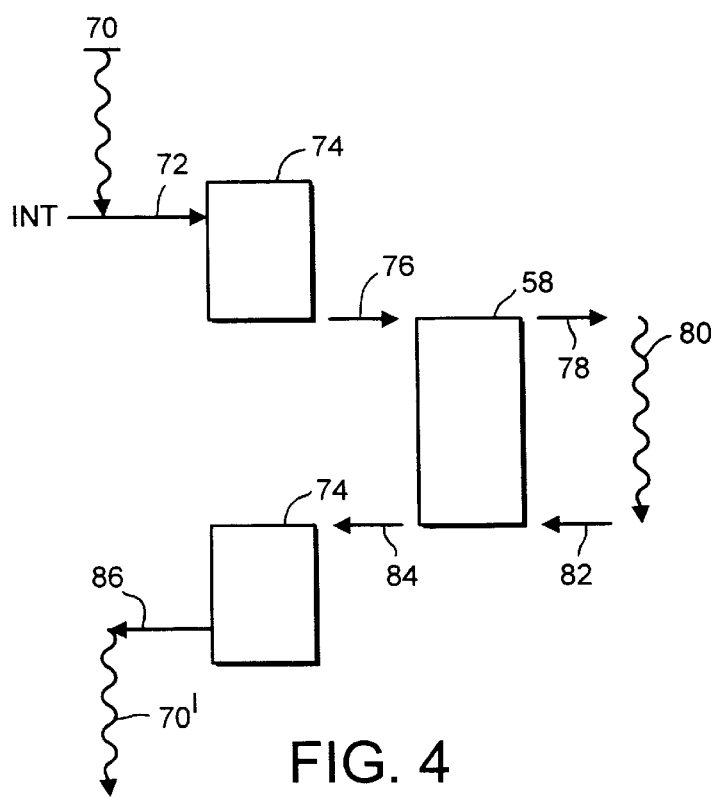
FIG. 4 is a flow diagram of the operation of such a mechanism.

FIG. 4 is a schematic representation of the processing of a software interrupt where, for example, this occurs during processing of a thread 70. It is assumed that the hardware on which the operating system is running includes a system stack 74. Accordingly, on the occurrence 72 of the interrupt (INT), if the software interrupt can now be handled, the trigger component 54 calls (76) the stack switching component 56 for saving the current state of the system in the system stack 74 and for causing the interrupt stack 58 to be switched in instead of the system stack 74. The switching component 56 then calls (78) the management component 60 for handling (80) the interrupt. On return from the interrupt handling, the management component 60 then calls (82) the stack switching component 56 for switching back (84) to the system stack 74. If no scheduling is required, then processing (70') of the interrupted thread 70 can be resumed.

Various aspects of an embodiment of the invention will now be described in more detail.

Figure 5:
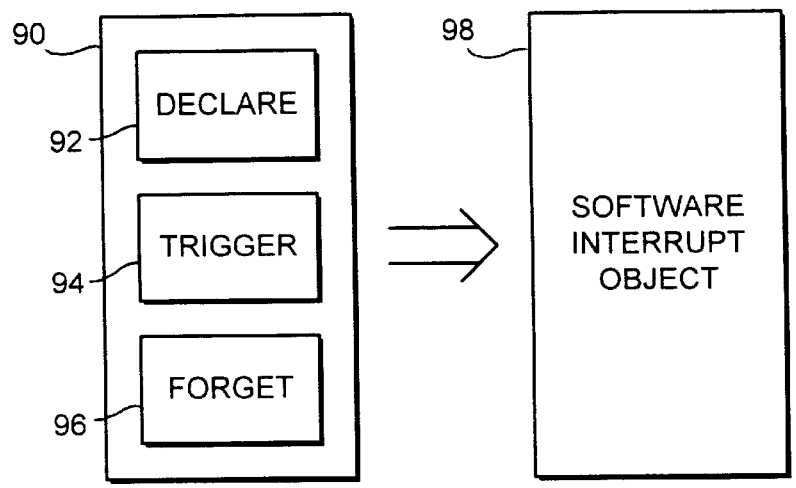
FIG. 5 is a schematic representation of a software interrupt interface.

As represented in FIG. 5, an embodiment of a software interrupt interface comprises three primitives, namely:

1) a declare primitive 92: int svSoftIntrDeclare (KnSoftIntr* pIntr);

2) a trigger primitive 94: void svSoftIntrTrigger(KnSoftIntr* pIntr); and 3) an optional forget primitive 96: void svSoftIntrForget (KnSoftIntr* pIntr).

The declare primitive 92 for a driver is called when that driver is booted in the system. The caller allocates a valid pointer to a KnSoftIntr interrupt handler data object 98, which has the layout shown in Table 3:

TABLE 3

```
#define SOFTINTR_MAX_PRIO    8
#define SINTR_TRIGGERED      0x00000001
#define SINTR_RUNNING        0x00000002
#define SINTR_FORGET         0x00000004
typedef void (*KnSoftHdl)(void*);
typedef struct KnSoftIntr {
    char            opaque[2 * sizeof(void*)];
    KnSoftHdl       handler;
    void*           arg;
    char*           name;
    unsigned char   priority;
    unsigned        status;
    void*           reserved;
};
```

The KnSoftIntr object 98 is a data structure containing the address of the handler, its argument (void*), its name and some opaque data used by the system. The following fields of the KnSoftIntr object are specified or updated by the caller:

handler—a pointer on a valid software interrupt handler;

arg—a pointer to an argument (not mandatory);

name—a string of characters for information (not mandatory);

priority—the priority of the handler (This is forced to 7 if not in range 0–7).

The other fields are not modified by a caller and are reserved for operating system use. Were an application to modify these fields, this could cause unpredictable behaviour.

The trigger primitive 94 can be called to trigger a software interrupt handler 98. A software interrupt handler can be triggered after all hardware interrupts have been processed at the interrupt level. Otherwise, it can be triggered immediately.

An optional forget primitive 96 can be triggered by a driver to disconnect its interrupt handler 98.

Figure 6:
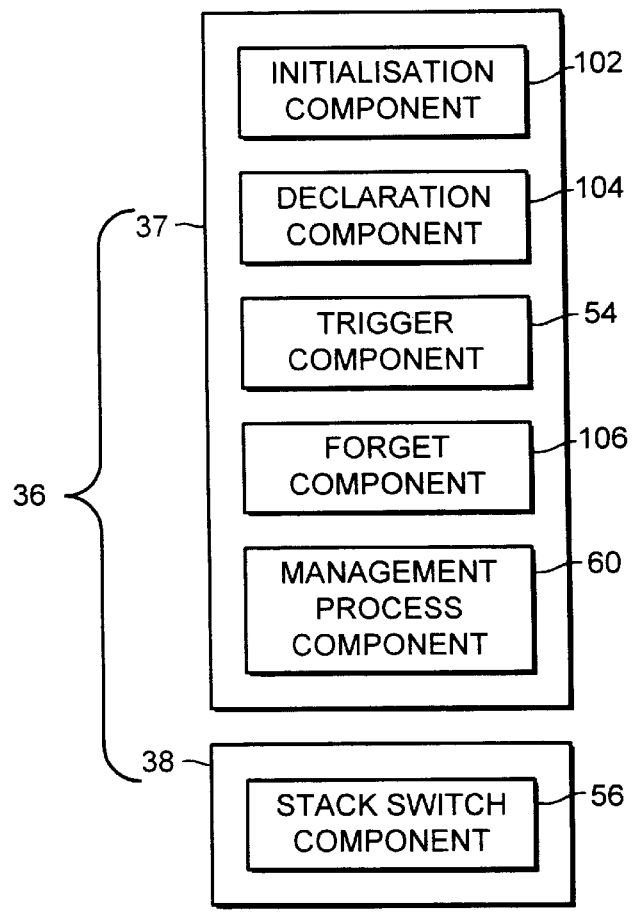
FIG. 6 is a schematic representation of an embodiment of a software interrupt mechanism in accordance with the invention.

As represented in FIG. 6, a software interrupt management mechanism according to one embodiment of the invention comprises five generic, portable, components 102, 104, 54, 106, 60 implemented in the C language and one hardware specific, non-portable component 56.

The portable components comprise:
1) a initialisation component (softIntrInit( )), which provides for initialisation of global variables;
2) a declaration component (svSoftIntrDeclare(KnSoftIntr* p)), which provides registration of software interrupt handler;
3) a trigger component (svSoftIntrTrigger(KnSoftIntr* p)), which enables triggering of a software interrupt handler;
4) an optional forget component (svSoftIntrForget (KnSoftIntr* p)), which enables removal of a software interrupt handler; and
5) a process management component (processSoftInterrupt( )), which provides the generic routine called either by the trigger component, or at the interrupt level at the end of hardware interrupt processing; this component calling all triggered software interrupt handlers beginning with the highest priority and progressing to the lowest priority.

The non-portable component 56 is the stack switch component (void callFuncWithStack(void* pStack, void (*pFunc)( ))), which is used to switch to the appropriate stack before invoking the process component described above. 'pFunc' is a pointer to the process component.

A global variable is shared between the system supervisor and the portable components to indicate that one or multiple software interrupt handlers are ready to be called. This variable is named: SoftIntrToCall.

Six internal global variables are used as part of the software interrupt mechanism.

curSoftIntrPrio: This unsigned variable records the actual priority of the software interrupt currently being executed. When no software interrupt is calling, this variable is set to SOFT-INTR_MAX_PRIO+1.

softPendingList [SOFTINTR_MAX_PRIO]: This provides a table of doubly linked lists for recording all pending software interrupts. There is one list per priority level. Each time a software interrupt is triggered, it is appended according to its priority in its corresponding list. When a software interrupt handler is called, its corresponding element is unlinked from the list.

pMapPrio: This unsigned character on 8 bits records the priority levels to call. In other words, when a Software Interrupt of priority 5 is triggered, the bit index 5 in pMapPrio is set to 1. This global variable is used to determine in a single operation the next non empty list avoiding a loop on softPendingList[ ] table.

prioMapHighestBitIndex[256]: This table of unsigned characters is filled by softIntrInit at boot time and contains for each value from 0 to 255 the index of the first bit set starting from the low significant bit. For instance:

prioMapHighestBitIndex[0x80]=7,
prioMapHighestBitIndex[0x17]=0,
prioMapHighestbitIndex[0x02]=1 and so forth. This table allows to get the highest priority level from pMapPrio in a single operation.

setPrio[SOFTINTR_MAX_PRIO]: This bitmap is used to set a bit in pMapPrio in a single operation. This table contains the following values: 0x01, 0x02, 0x04, 0x08, 0x10, 0x20, 0x40, 0x80.

resetPrio[SOFTINTR_MAX_PRIO]: This bitmap is used to reset a bit in pMapPrio in a single operation. Each element contains the one's complement of the corresponding setPrio[ ] element.

The operation of the interrupt mechanism will now be described in more detail.

At a boot time the initialisation component is called to initialise all the global variables:
the various doubly linked are reset (i.e. lists are empty);

curSoftIntrPrio is set to SOFTINTR_MAX+1;
prioMapHighestBitIndex[ ], table is initialized with the appropriate values.

At the supervisor level, after processing hardware interrupts and if and only if SoftIntrToCall is not set to 0, the process component is called.

Figure 7:
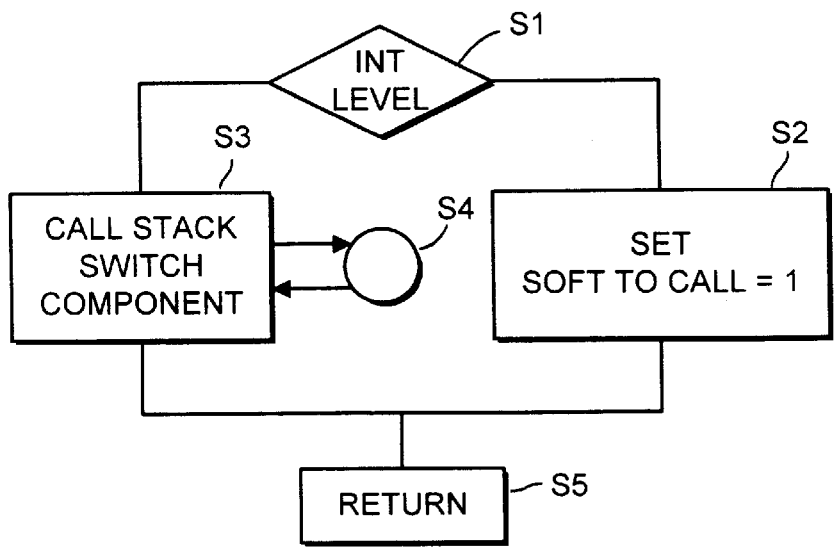
FIG. 7 is a flow diagram illustrating the operation of a trigger component of the interrupt mechanism.

The process component can also be called by the trigger component under the conditions represented by the pseudocode argument represented in Table 4, which pseudocode provides an overview of the functionality of the trigger component:

TABLE 4 if [interrupt level or all interrupts are masked] then
    if [current software interrupt priority < curSoftIntrPrio]
        softIntrToCall=1
    fi
    return
else
    call Stack Switch Component
fi
return The process of Table 4 is also represented in FIG. 7. Accordingly, if (step S1) the trigger component is called at hardware interrupt level, the global variable SoftIntrToCall is set to 1 (step S2), whereby the supervisor subsequently calls the stack switch component when any outstanding hardware interrupt processing is completed. Otherwise, the stack switch component is immediately called (step S3). In this case, the stack switch component is invoked in order to switch to an appropriate stack. This can be achieved with a function call:

CallFuncWithStack(p_cpuIntrStack, processSoftIntr), where p_cpuIntrStack refers the interrupt stack bottom.

On return (step S4) from the stack switch component, control is returned to the caller at (step S5).

Figure 8:
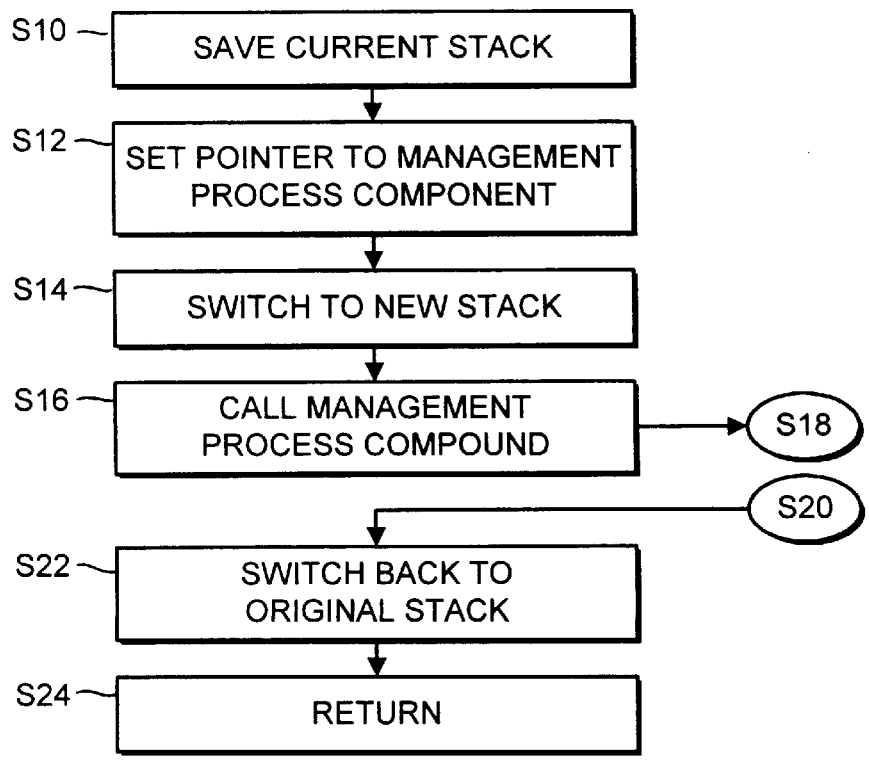
FIG. 8 is a flow diagram illustrating the operation of a stack switching component of the interrupt mechanism.

FIG. 8 is a schematic block diagram of the processes conducted by an example of a stack switching component. This components switches on a new stack and calls a function (the management component 60) without an argument, and then switches back to the original stack. In the particular embodiment described, re-entrant code is used. It can be implemented as a "C" handler, or an assembly routine.

In step S10, on being called, the stack switching component saves the current stack, for example in a non-scratch register.

In step S12 it sets a pointer to the management component 60.

In step S14 it switches to the new stack for the storage of system parameters during interrupt processing.

In step S16 it then calls the management component, control being passed at S18 to the management component for managing the software interrupt handling.

On return at S20 from the management component, in step S22, the stack switching component switches back to the original stack and, in step S24, returns control to the caller which called the stack switching component.

Where reference is made to an interrupt stack, it should be appreciated that this does not require a particular form of data structure, merely a data structure which can be configured to permit buffering and subsequent retrieval of system data. It could, for example, be an area of general purpose random access storage. Also, where reference is made to "switching to" an interrupt stack, this could involve pointing to an existing stack, or could involve creating a data structure for buffering system variables. Similarly, after interrupt processing, a pointer could simply be directed back to the system stack, if present, and/or cancelling the temporary data structure for the interrupt stack.

In a preferred embodiment of the invention, the management component 60 is re-entrant and can also be called when an hardware interrupt pre-empts a software interrupt handler. This situation can occur when a hardware interrupt pre-empts a software interrupt handler as represented by the pseudocode, which gives an overview of the operation of the management component 60, in Table 5 below:

TABLE 5

```
f_imsIntrLevel < 2 otherwise return
Save curSoftIntrPrio in a local variable: prevSoftIntrPrio
start:
    Loop on non empty lists
        Get the highest priority and update it if list is empty
        unmask all interrupts
        call the handler
        Mask all interrupts
    while [Highest priority < prevSoftIntrPrio]go to start
    Restore curSoftIntrPrio from prevSoftIntrPrio
    Return
```

Figure 9:
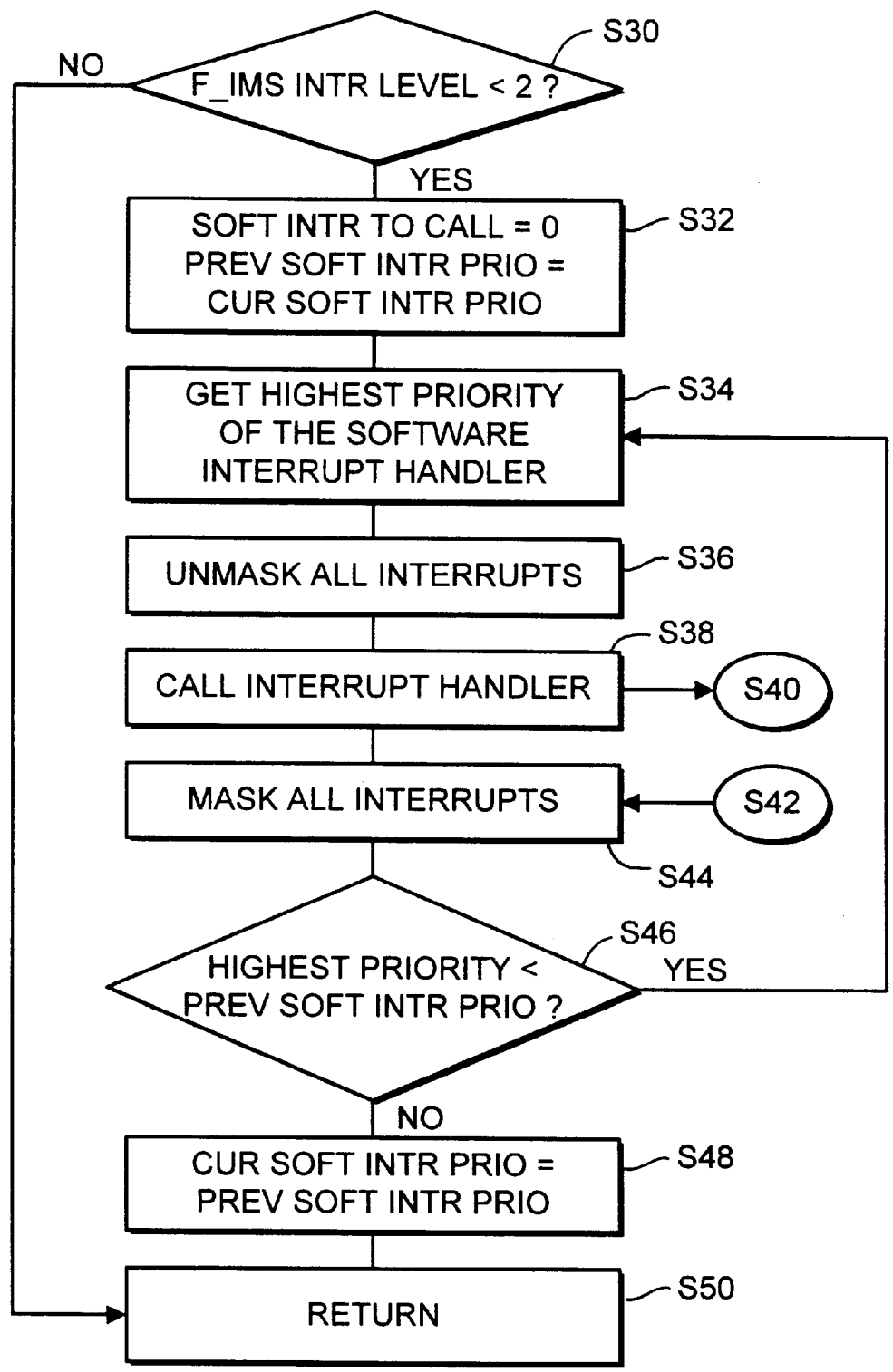
FIG. 9 is a flow diagram illustrating the operation of a management component of the interrupt mechanism.

The operation of the management component is also illustrated in the flow diagram of FIG. 9. A global variables f_imsIntrLevel in step S30 is updated by the supervisor (Component 18 FIGS. 1 and 3) recording the nesting level of hardware interrupt. When there is no interrupt this variable is equal to 0. Upon interrupt, this variable is incremented, and before returning from interrupt it is decremented. For instance when this variable is equal to 2, it means that two hardware interrupts are nested. In other words, a hardware interrupt has preempted another hardware interrupt. Specifically, when the management component is called, this global variable is tested, and when it is strictly greater than 2, the operation ends immediately. This means that another hardware interrupt is pending. When f_imsIntrLevel is equal to 2, a software interrupt preemption has occurred, otherwise f_imsIntrLevel is equal to 1. Specifically, when the management component is called, softIntrToCall is set to zero and curSoftIntrPrio is saved in a local variable prevSoftIntrPrio in step S32. Then, the management component loops on non empty lists from the highest priority to prevSoftIntrPrio. Each time a software interrupt is unlinked from a list the highest priority is updated in pMapPrio when the list becomes empty. Thus, in step S34, for the current highest priority, control is passed to step S36 which unmasks all interrupts. Then, in step S38, the software interrupt handler is called from the interrupt to be processed. Thus, control is passed at S40 to a conventional interrupt handler.

At step S42, on return of control following interrupt processing, in step S44, all interrupt are masked. Then, in step S46, the highest priority is compared against prevSoftIntrPrio, and control is passed to step S34 if this assertion is true, otherwise control is passed to step S48.

In step S48, curSoftIntrPrio is restored from prevSoftIntrPrio and control is returned (S50) to the stack switching component S56.

Thus, there has been described a software interrupt processing and management mechanism. The management component 60 provides for software interrupt management. The processing of the individual software interrupts is handled by the software interrupt handler object 98 declared by the software interrupt interface (see FIG. 5).

The status of a software interrupt handler 98 is set to 0 when it is declared. When a software interrupt handler 98 is triggered, its status is set to SINTR_TRIGGERED by the trigger component 54. On invocation, the status of the currently executing software interrupt handler 98 is set to SINTR_RUNNING by the process component 60 and a SINTR_TRIGGERED bit is set to zero. After execution the SINTR_RUNNING bit is set to zero.

The removal of a software interrupt handler 98 can be effected at any moment by the forget component. When the status of a software interrupt handler is set to SINTR_TRIGGERED, the corresponding element is removed from the list of interrupt handlers and its status is set to zero. When the status of a software interrupt handler is set to SINTR_RUNNING, the SINTR_FORGET bit is also set. This latter bit will be checked by the process component if the interrupt handler returns preventing any re-execution if any.

It will be appreciated that although particular embodiments of the invention have been described, many modifications/additions and/or substitutions may be made within the spirit and scope of the present invention as defined in the appended claims. With reference to those claims, it is to be noted that combinations of features of the dependent claims other than those explicitly enumerated in the claims may be made with features of other dependent claims and/or independent claims, as appropriate, within the spirit and scope of the present invention.

What is claimed is:

1. An interrupt mechanism for an operating system which is portable to different data processing hardware, said interrupt mechanism comprising:

a management component configured to be operable to manage at least one software interrupt process and to buffer system parameters in an interrupt stack during software interrupt processing, said management component being configured to be hardware independent; and a hardware dependent component configured to be operable to select said interrupt stack and then to call said management component for managing said software interrupt processing and further to be operable to deselect said interrupt stack on completion of said software interrupt processing.

2. The interrupt mechanism of claim 1 for an operating system comprising a system stack, wherein said hardware dependent component is configured to be operable to switch from said system stack to said interrupt stack for software interrupt processing and further to be operable to switch from said interrupt stack to said system stack on completion of said software interrupt processing.

3. The interrupt mechanism of claim 1, wherein said hardware dependent component is configured to be operable to create an interrupt stack for said software interrupt processing and further to be operable to delete said interrupt stack on completion of said software interrupt processing.

4. The interrupt mechanism of claim 1, comprising a software interrupt trigger component, said software interrupt trigger component being responsive to an interrupt event to call said hardware dependent component.

5. The interrupt mechanism of claim 4, wherein said software interrupt trigger component is responsive to a hardware interrupt handler.

6. The interrupt mechanism of claim 4, wherein said software interrupt trigger component is responsive to an interrupt from a task.

7. The interrupt mechanism of claim 1, wherein said management component is further configured to be operable to cause a scheduler to be locked out during said software interrupt process.

8. The interrupt mechanism of claim 1, comprising an invocation component for invoking a software interrupt handler, wherein each software interrupt handler is allocated a priority level and wherein said management component is configured to be operable to call multiple said software interrupt handlers in order of priority.

9. In a data processor providing a processing hardware for an operating system, an operating system portable to different hardware, said operating system comprising an interrupt mechanism comprising:

a management component configured to be operable to manage at least one software interrupt process and to buffer system parameters in an interrupt stack during software interrupt processing, said management component being configured to be hardware independent; and a hardware dependent component configured to be operable to select said interrupt stack and then to call said management component for managing said software interrupt processing and further to be operable to deselect said interrupt stack on completion of said software interrupt processing.

10. The operating system of claim 9, comprising a system stack, wherein said hardware dependent component is configured to be operable to switch from said system stack to said interrupt stack for said software interrupt processing and further to be operable to switch from said interrupt stack to said system stack on completion of said software interrupt processing.

11. The operating system of claim 9, wherein said hardware dependent component is configured to be operable to create an interrupt stack for said software interrupt processing and further to be operable to delete said interrupt stack on completion of said software interrupt processing.

12. The operating system of claim 9, comprising a software interrupt trigger component, said software interrupt trigger component being responsive to an interrupt event to call said hardware dependent component.

13. The operating system of claim 12, wherein said software interrupt trigger component is responsive to a hardware interrupt handler.

14. The operating system of claim 12, wherein said software interrupt trigger component is responsive to an interrupt from a task.

15. The operating system of claim 9, comprising a scheduler, said scheduler being configured to be locked out during said software interrupt process.

16. The operating system of claim 9 comprising an invocation component for invoking a software interrupt handler, wherein each software interrupt handler is allocated a priority level and wherein said management component is configured to be operable to call multiple said software interrupt handlers in order of priority.

17. A computer program implemented operating system on a carrier medium, said operating system being portable to different data processing hardware and including an interrupt mechanism, which interrupt mechanism comprises:

a management component configured to be operable to manage at least one software interrupt process and to buffer system parameters in an interrupt stack during software interrupt processing, said management component being configured to be hardware independent; and a hardware dependent component configured to be operable to select said interrupt stack and then to call said management component for managing said software interrupt processing and further to be operable to deselect said interrupt stack on completion of said software interrupt processing.

18. An interrupt mechanism for an operating system portable to different data processing hardware, said interrupt mechanism comprising:

management means configured to be operable to manage at least one software interrupt process and to buffer system parameters in an interrupt stack during software interrupt processing, said management means being configured to be hardware independent; and a hardware dependent means configured to be operable to select said interrupt stack and then to call said management means for managing said software interrupt processing and further to be operable to deselect said interrupt stack on completion of said software interrupt processing.

19. A method of processing interrupts in a data processing system including an operating system portable to different data processing hardware, said method including steps of:

in a hardware dependent component, selecting an interrupt stack and calling a hardware independent management component;

in said management component, managing at least one software interrupt process and buffering system parameters in said interrupt stack during software interrupt processing; and in said hardware dependent component, deselecting said interrupt stack on completion of said software interrupt processing.

* * * * *